(12) United States Patent
Biskeborn et al.

(10) Patent No.: US 11,393,501 B2
(45) Date of Patent: Jul. 19, 2022

(54) PROTECTIVE LAYER FOR MITIGATING PROTRUDING DEFECTS IN MAGNETIC TAPE RECORDING MEDIA

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 16/447,750

(22) Filed: Jun. 20, 2019

(65) Prior Publication Data

US 2019/0304495 A1 Oct. 3, 2019

Related U.S. Application Data

(62) Division of application No. 15/158,447, filed on May 18, 2016, now Pat. No. 10,395,684.

(51) Int. Cl.
| | |
|---|---|
| *G11B 5/708* | (2006.01) |
| *G11B 5/716* | (2006.01) |
| *G11B 5/72* | (2006.01) |
| *G11B 5/73* | (2006.01) |
| *G11B 5/84* | (2006.01) |

(52) U.S. Cl.
CPC .............. *G11B 5/708* (2013.01); *G11B 5/716* (2013.01); *G11B 5/72* (2013.01); *G11B 5/726* (2020.08); *G11B 5/728* (2020.08); *G11B 5/737* (2019.05); *G11B 5/736* (2019.05); *G11B 5/8404* (2013.01); *G11B 5/8408* (2013.01)

(58) Field of Classification Search
CPC ........... G11B 5/708; G11B 5/716; G11B 5/72; G11B 5/7085; G11B 5/68; G11B 5/70; G11B 5/78; G11B 5/7305; G11B 5/737; G11B 5/7368; G11B 5/7369
See application file for complete search history.

(56) References Cited

U.S. PATENT DOCUMENTS

| | | | |
|---|---|---|---|
| 4,513,054 A | 4/1985 | Kitamoto et al. | |
| 5,149,585 A | 9/1992 | Goto et al. | |
| 5,474,814 A * | 12/1995 | Komatsu | G11B 5/845 427/549 |
| 5,728,454 A | 3/1998 | Inaba et al. | |
| 6,194,058 B1 | 2/2001 | Isobe et al. | |
| 6,284,361 B1 * | 9/2001 | Kobayashi | G11B 5/733 428/323 |
| 6,303,280 B1 | 10/2001 | Matsunaga et al. | |
| 6,881,495 B2 | 4/2005 | Kikitsu et al. | |

(Continued)

OTHER PUBLICATIONS

Biskeborn et al., U.S. Appl. No. 15/158,447, filed May 18, 2016.
(Continued)

*Primary Examiner* — Holly Rickman
(74) *Attorney, Agent, or Firm* — Zilka-Kotab, P.C.

(57) ABSTRACT

A magnetic recording medium according to one embodiment includes a base film and a first nonmagnetic layer above the base film. The first nonmagnetic layer has first nonmagnetic particles. A second nonmagnetic layer is positioned above the first nonmagnetic layer, the second nonmagnetic layer having second nonmagnetic particles. A magnetic layer is positioned above the second nonmagnetic layer, the magnetic layer including a magnetic material.

18 Claims, 9 Drawing Sheets

(56) References Cited

U.S. PATENT DOCUMENTS

| | | | |
|---|---|---|---|
| 7,324,305 B2 | 1/2008 | Inomata | |
| 10,395,684 B2 | 8/2019 | Biskeborn et al. | |
| 11,322,175 B2 | 5/2022 | Biskeborn et al. | |
| 2002/0098384 A1 | 7/2002 | Komatsu et al. | |
| 2005/0089683 A1 | 4/2005 | Hattori et al. | |
| 2005/0264935 A1* | 12/2005 | Sueki | G11B 5/70 360/134 |
| 2006/0222902 A1 | 10/2006 | Mukai | |
| 2006/0286413 A1 | 12/2006 | Liu et al. | |
| 2007/0020490 A1 | 1/2007 | Harasawa et al. | |
| 2009/0162701 A1 | 6/2009 | Jensen et al. | |
| 2017/0337944 A1 | 11/2017 | Biskeborn et al. | |
| 2019/0304494 A1 | 10/2019 | Biskeborn et al. | |
| 2019/0311736 A1 | 10/2019 | Biskeborn et al. | |

OTHER PUBLICATIONS

Restriction Requirement from U.S. Appl. No. 15/158,447, dated May 17, 2018.
Non-Final Office Action from U.S. Appl. No. 15/158,447, dated Oct. 18, 2018.
Final Office Action from U.S. Appl. No. 15/158,447, dated Feb. 13, 2019.
Notice of Allowance from U.S. Appl. No. 15/158,447, dated Apr. 25, 2019.
Biskeborn et al., U.S. Appl. No. 16/447,706, filed Jun. 20, 2019.
Biskeborn et al., U.S. Appl. No. 16/447,746, filed Jun. 20, 2019.
List of IBM Patents or Patent Applications Treated as Related.
Non-Final Office Action from U.S. Appl. No. 16/447,706, dated Sep. 22, 2021.
Non-Final Office Action from U.S. Appl. No. 16/447,746, dated Apr. 28, 2021.
Notice of Allowance from U.S. Appl. No. 16/447,746, dated Mar. 23, 2022.
Notice of Allowance from U.S. Appl. No. 16/447,706, dated Apr. 14, 2022.
Corrected Notice of Allowance from U.S. Appl. No. 16/447,706, dated May 4, 2022.
Final Office Action from U.S. Appl. No. 16/447,746, dated Sep. 27, 2021.
Non-Final Office Action from U.S. Appl. No. 16/447,746, dated Dec. 1, 2021.

* cited by examiner

US 11,393,501 B2

PROTECTIVE LAYER FOR MITIGATING PROTRUDING DEFECTS IN MAGNETIC TAPE RECORDING MEDIA

BACKGROUND

The present invention relates to data storage systems, and more particularly, this invention relates to magnetic tape recording media having reduced occurrence of protruding defects.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

A magnetic recording medium according to one embodiment includes a base film and a first nonmagnetic layer above the base film. The first nonmagnetic layer has first nonmagnetic particles. A second nonmagnetic layer is positioned above the first nonmagnetic layer, the second nonmagnetic layer having second nonmagnetic particles. A magnetic layer is positioned above the second nonmagnetic layer, the magnetic layer including a magnetic material.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage media.

In one general embodiment, a magnetic recording medium includes an underlayer and a magnetic layer above the underlayer. The magnetic layer includes a first magnetic material and particulates. A protective layer is positioned above the magnetic layer, the protective layer including a second material.

In another general embodiment, a magnetic recording medium includes a base film and a first nonmagnetic layer above the base film. The first nonmagnetic layer has first nonmagnetic particles. A second nonmagnetic layer is positioned above the first nonmagnetic layer, the second nonmagnetic layer having second nonmagnetic particles. A magnetic layer is positioned above the second nonmagnetic layer, the magnetic layer including a magnetic material.

In yet another general embodiment, a method for forming a magnetic recording medium includes forming a magnetic layer above a substrate, the magnetic layer including a first magnetic material and particulates, and forming a protective layer above the magnetic layer, the protective layer including a second material.

Figure 1A:
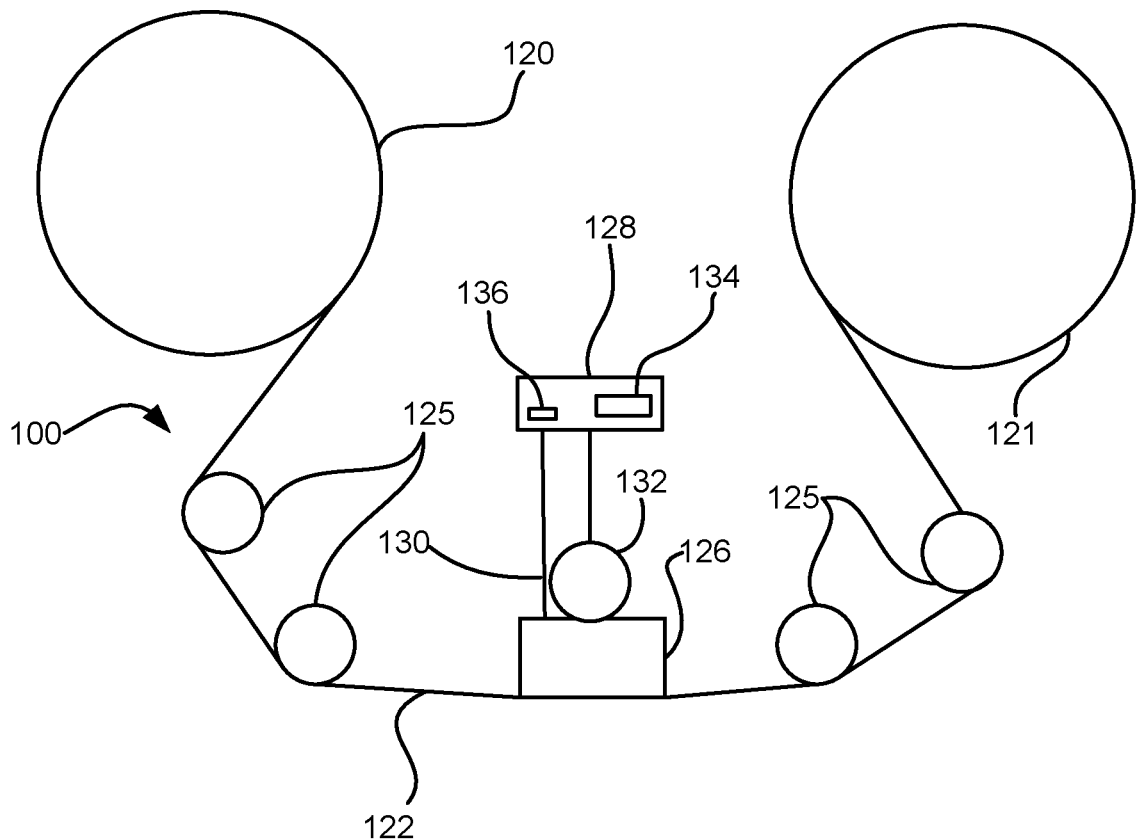
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
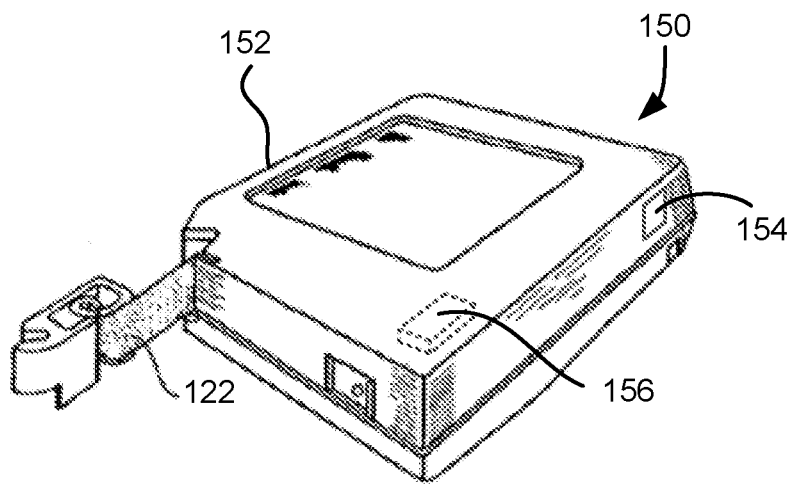
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
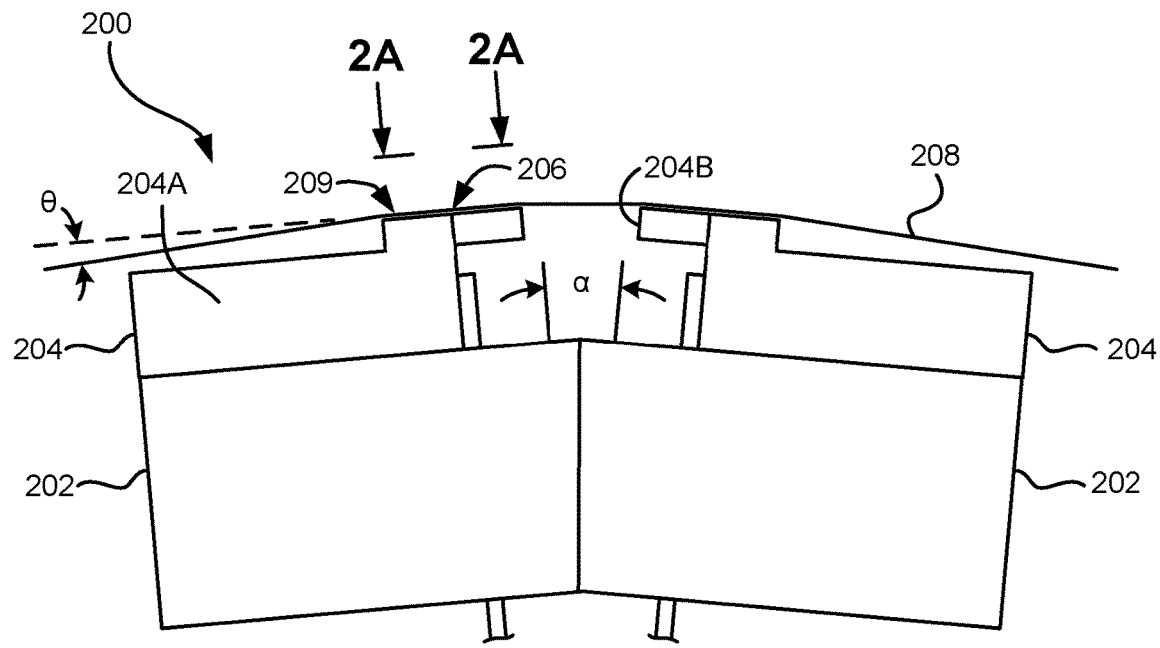
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
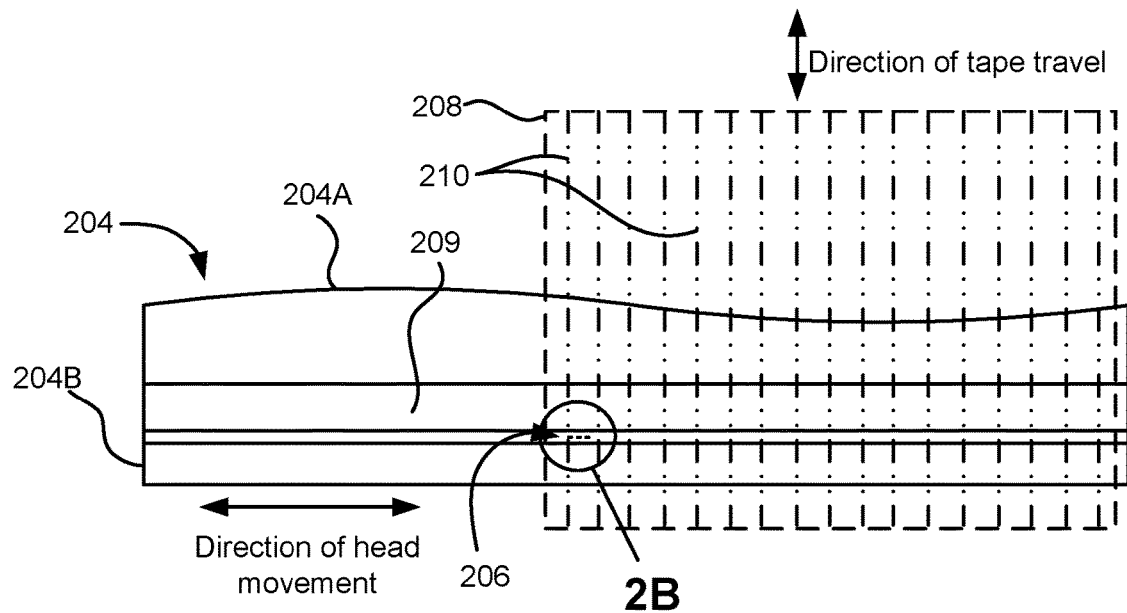
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
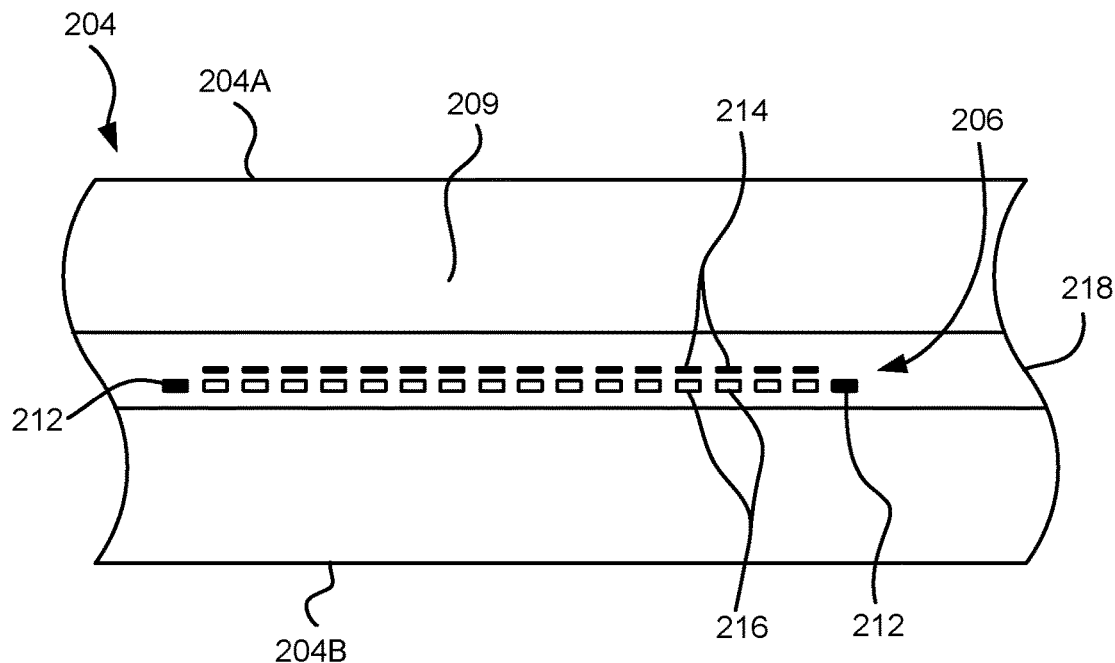
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include κ, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
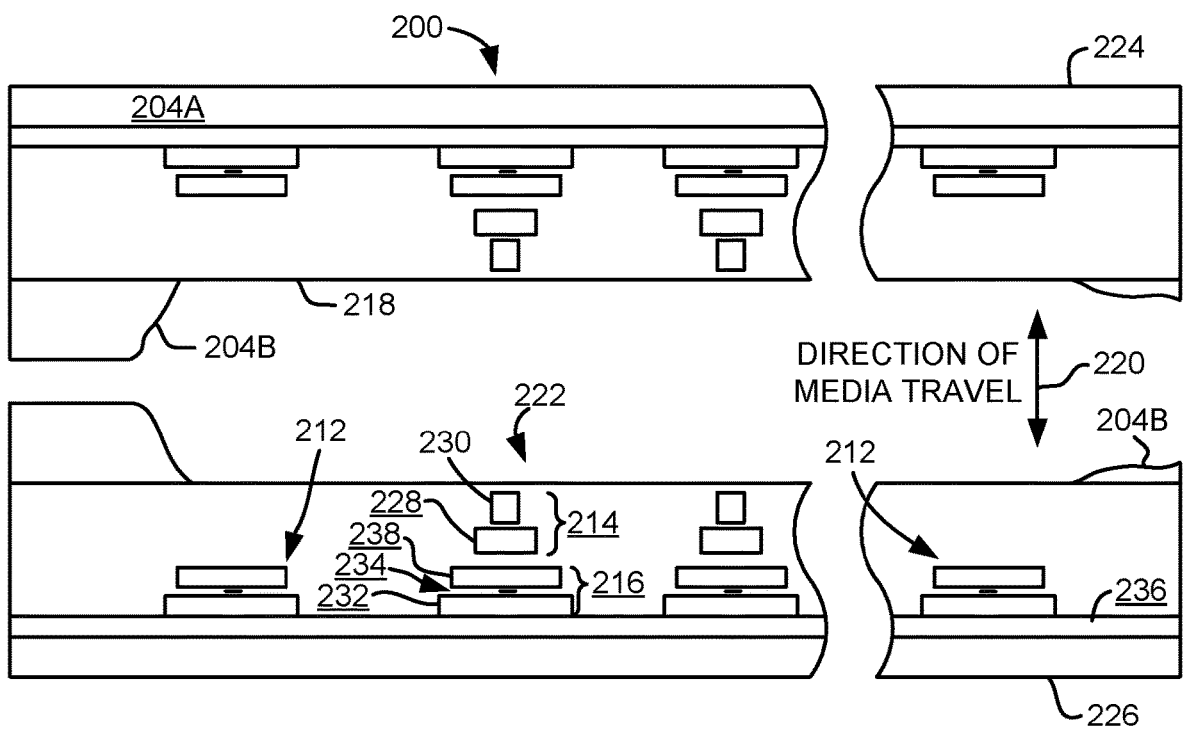
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
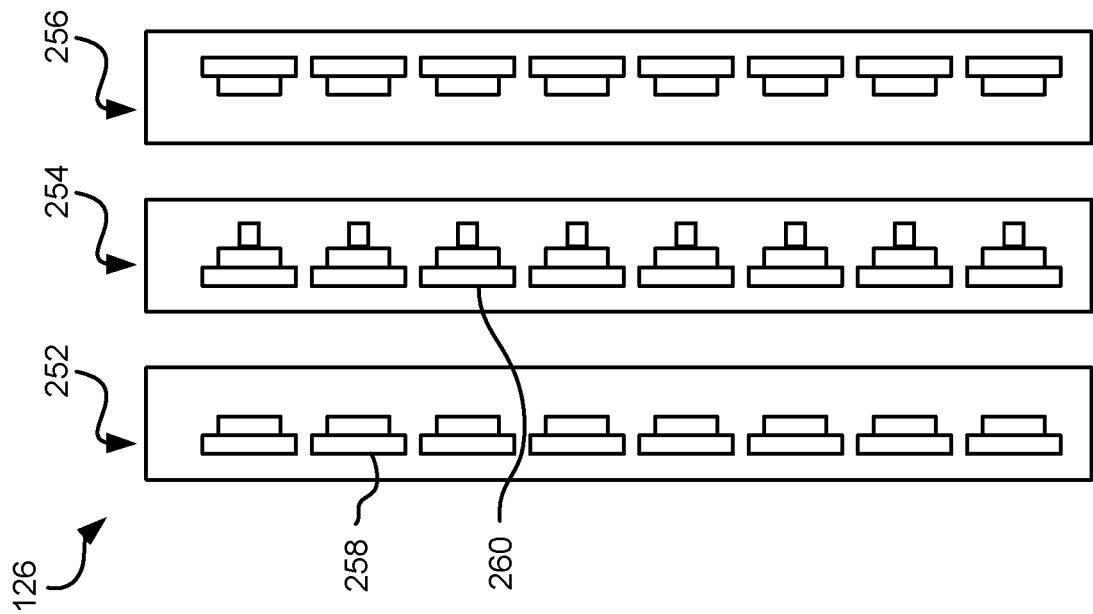
FIG. 4 is a partial tape bearing surface view of a magnetic head having a read-write-read configuration.
Figure 3:
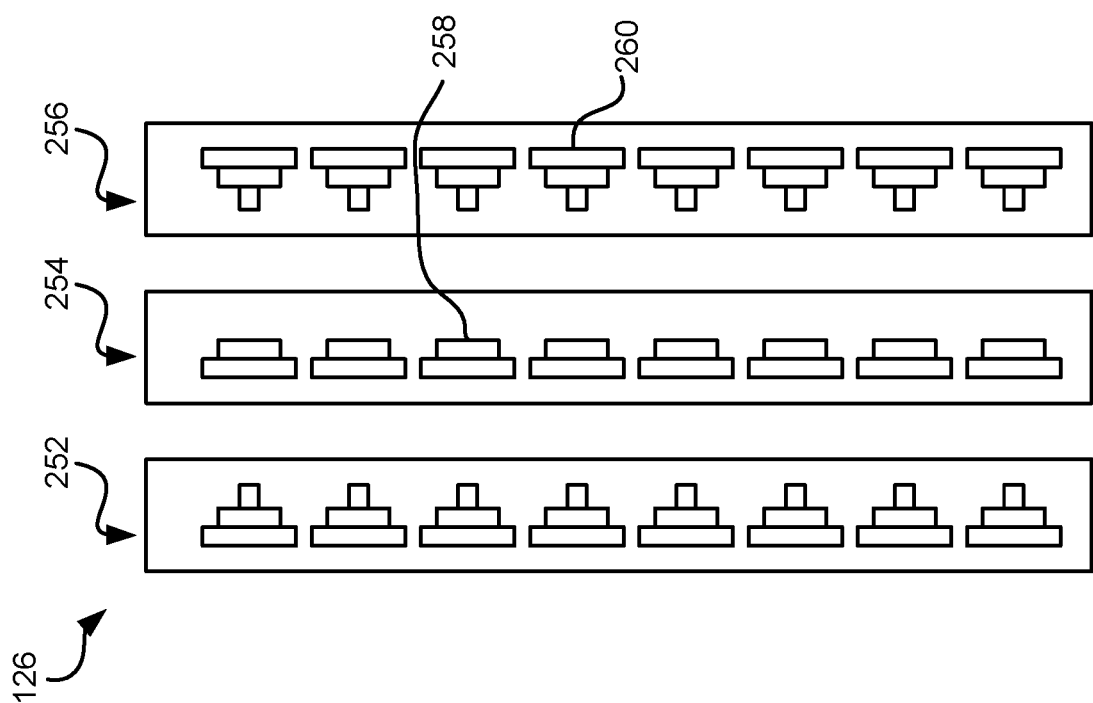
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
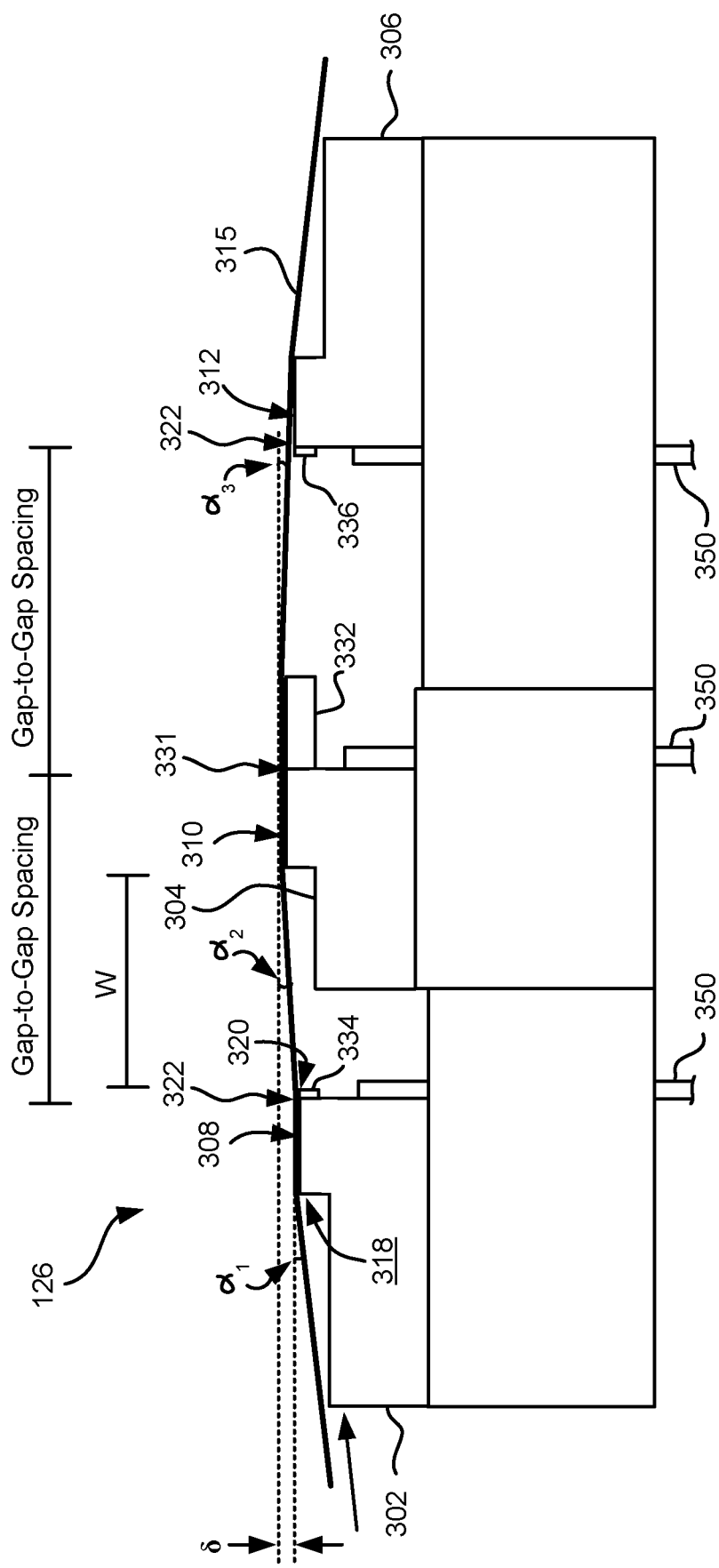
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
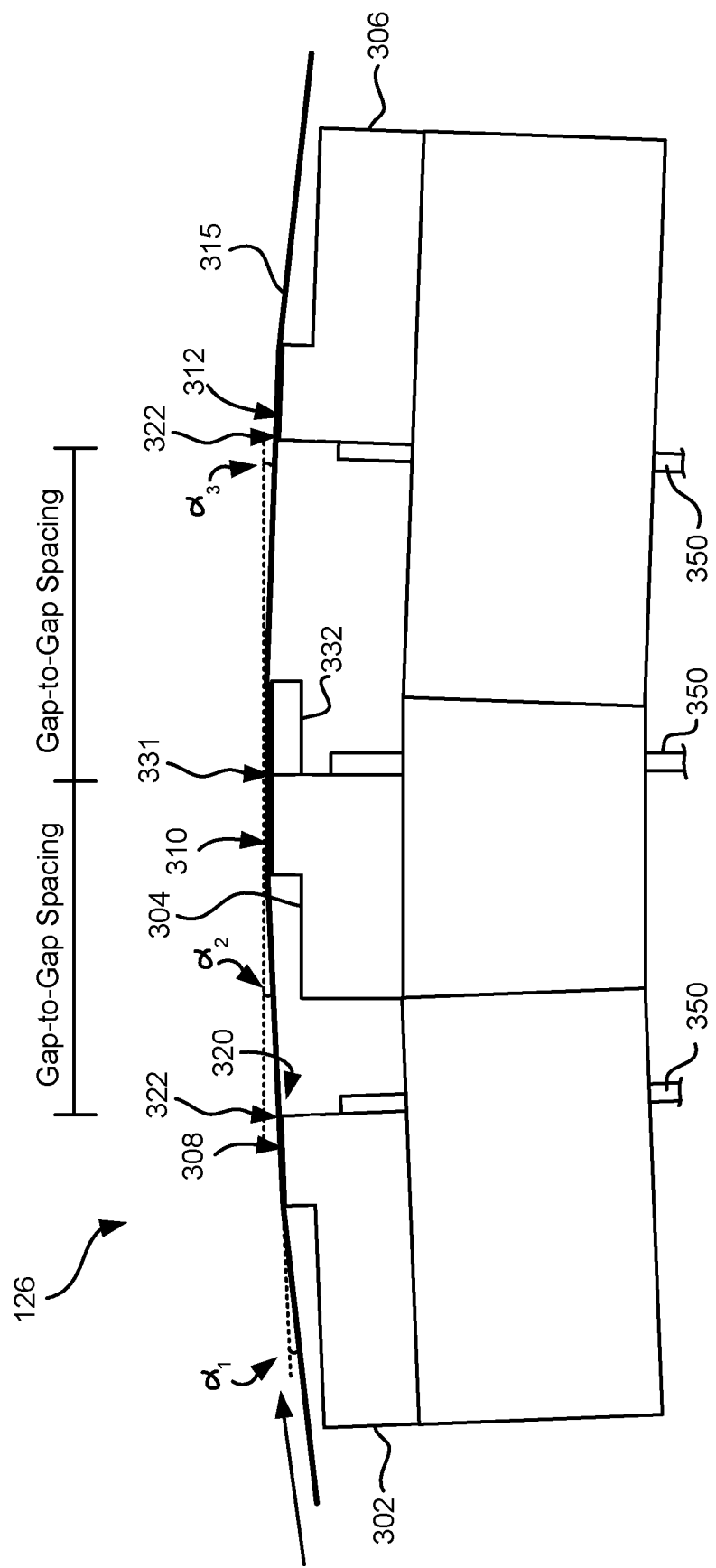
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
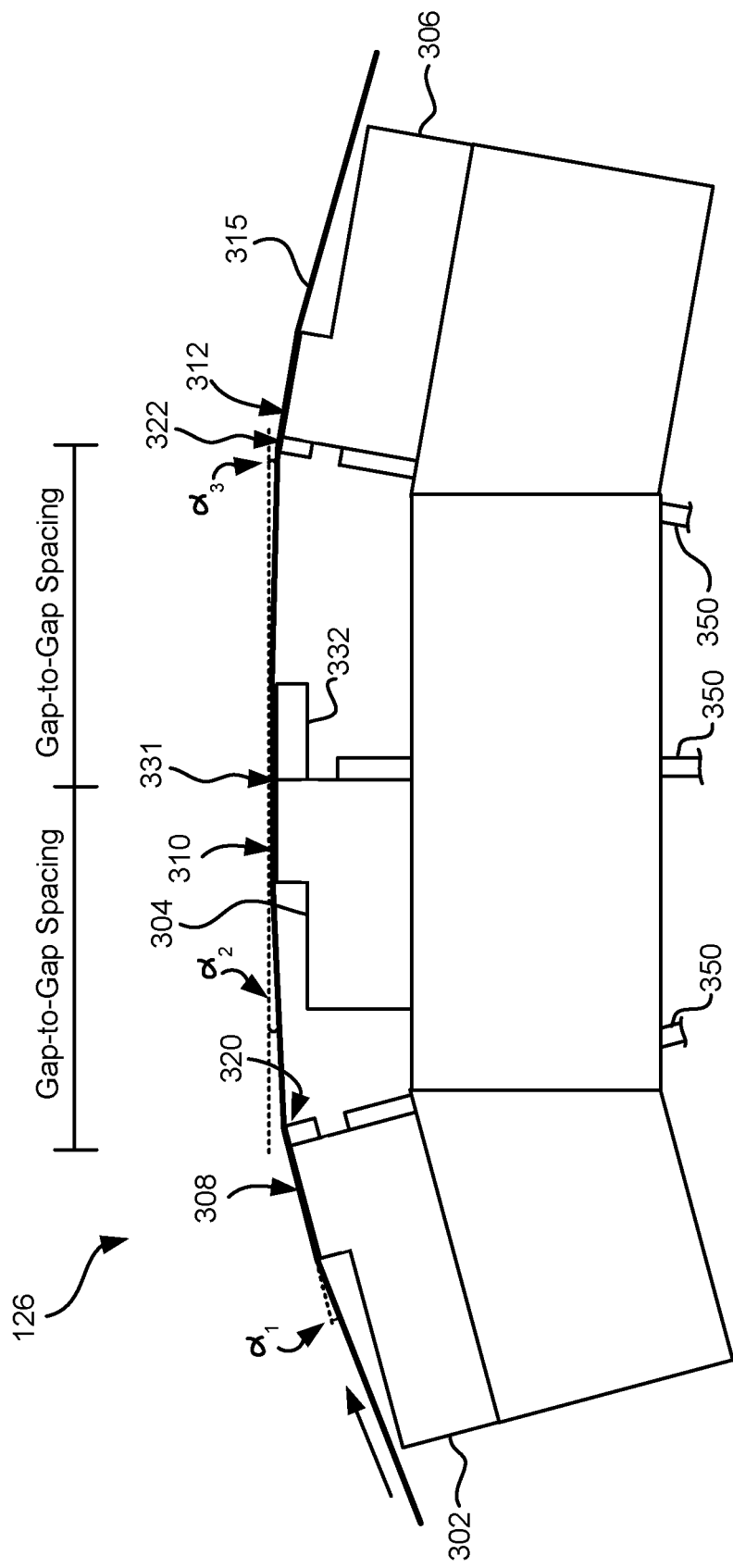
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Servo pattern and data read sensors may experience shorting failures during normal data writing and/or reading operations. Particularly, such shorting may be caused by defects (herein "defects") that protrude from the magnetic tape recording media (also generically referred to as "tape"), such as agglomerations of for example abrasive nonmagnetic particulates and/or binder materials; or other defects, e.g., hard particulates, that protrude from the tape surface. For example, as is well known for tape media in particular, larger foreign particles, e.g., remnants of alpha-hematite production, may be present in a layer or layers of the media. Such defects may be in the form of a particle (solid or agglomeration) that has a dimension, e.g., diameter or length along most distant points thereof, that is at least twice as great as an average diameter of the particles in the layer having similar materials, e.g., smaller particles similar to those that have agglomerated to form the defect. In some cases, the defect may have a dimension that is greater than a thickness of the layer and so is the source of the defect.

Whatever the source or composition, such defects, when protruding from the upper surface of the medium, may smear and/or plow conductive material from the thin films of the reader across the sensor, thereby creating an electrical short.

While this issue is relevant to both current-in-plane and more particularly to current-perpendicular-to-plane (CPP) readers in general, this problem is particularly problematic with CPP TMR sensors. Because the deposition thickness of the tunnel barrier the TMR sensor is very thin, e.g., less than about 10 angstroms in some approaches, smearing of conductive material thereacross is a pervasive problem. Accordingly, TMR sensors may be particularly susceptible to such shorting due to the thin sensor barrier.

Interactions between tape media surface defects and a sensor surface may also lead to friction-related functionality issues. For example, when a surface defect passes over a sensor, friction may lead to plastic deformation of one or more delicate thin films of the sensor. Plastic deformation of the delicate thin films may alter the stress distribution inside the sensor, and this may be presented as noise due to magnetic instability, e.g., switching magnetic domains.

Narrower write heads may also be subject to degradation via spacing loss resulting from gouges caused by tape surface defects.

Such surface defects may result from, e.g., the milling of particles used in the manufacturing process of the tape, e.g., where a large particle becomes captured in a coating of the tape media during manufacture; a manufacturing defect during any known manufacturing process, such as creation of an agglomerate of particulates or binder that protrudes from the media; etc.

Embodiments described herein include implementing a thin protective overcoat on a layer of the tape media, to help mitigate tape media defect abrasivity.

Figure 8A:
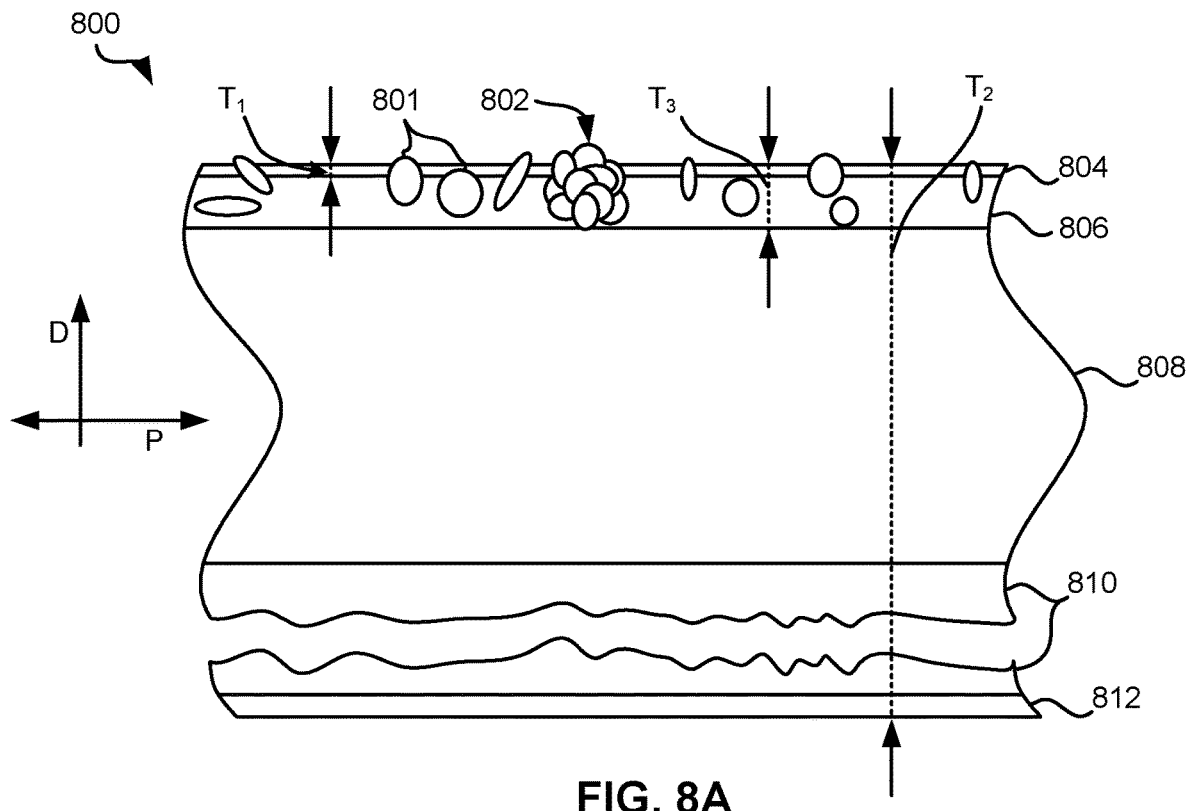
FIG. 8A is a magnetic recording medium with a protective layer, according to one embodiment.
Figure 8B:
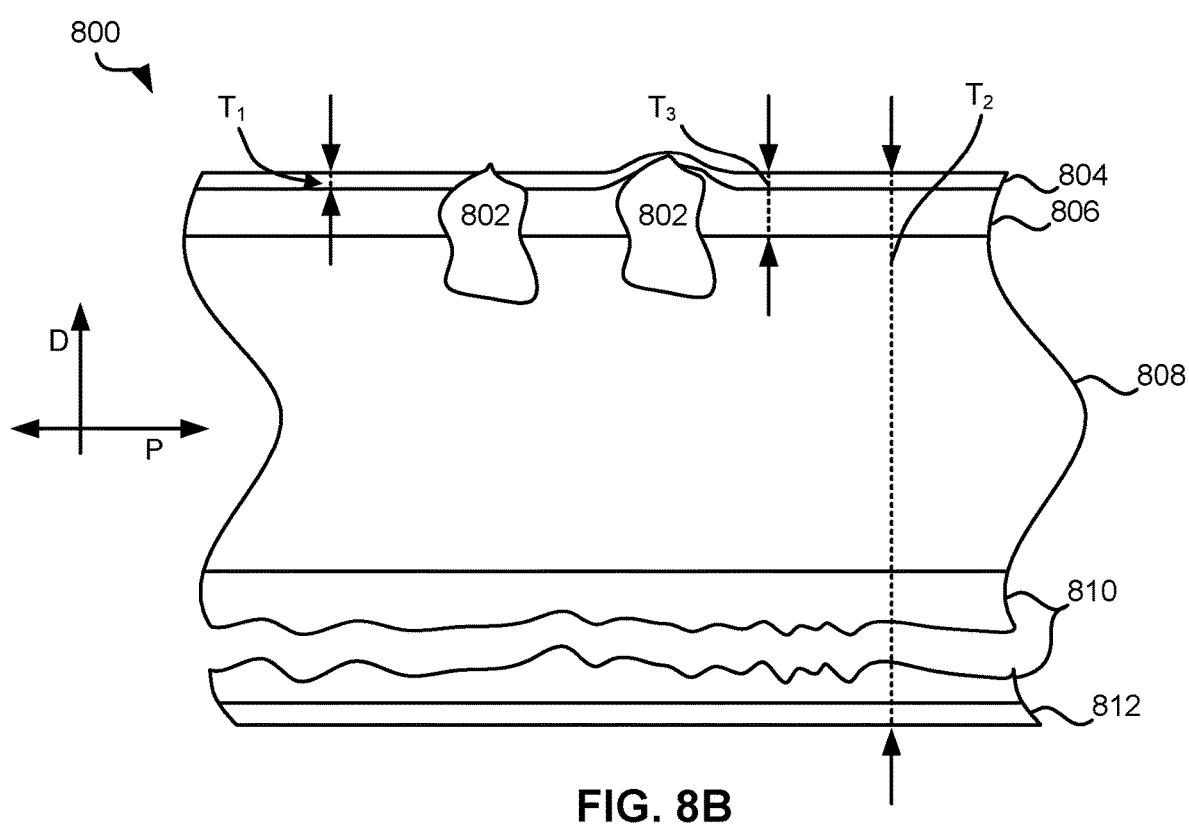
FIG. 8B is a magnetic recording medium with a protective layer, according to one embodiment.

FIGS. 8A and 8B depicts sections of a magnetic recording medium 800 in which tape media surface defects are minimized, in accordance with one embodiment. As an option, the present magnetic recording medium 800 may be implemented in conjunction with features from any other embodiment listed herein, such as those described with reference to the other FIGS. Of course, however, such magnetic recording medium 800 and others presented herein may be used in various applications and/or in permutations which may or may not be specifically described in the illustrative embodiments listed herein. Further, the magnetic recording medium 800 presented herein may be used in any desired environment. Moreover, except where specifically specified, various components may be of conventional construction.

The magnetic recording medium 800 may be any type of magnetic recording medium that includes protruding defects 802. For example, the magnetic recording medium may be a magnetic tape.

The magnetic recording medium 800 may include a conventional underlayer 808. The underlayer 808 may be added as a smoothing layer over the base film 810. The underlayer 808 may be positioned above a conventional base film 810 and back coat 812 of the magnetic recording medium 800. For example, the base film 810 may include a known aramid, polyethylene naphthalate, polyethylene terephthalate, etc. The magnetic recording medium 800 may include a magnetic layer 806 above the underlayer 808. Other and/or alternative conventional layers may be present in this and other embodiments described herein. Illustrative thicknesses for the various layers include a base film thickness of about 2000 to about 6000 nanometers, an underlayer thickness of about 800 to about 2000 nanometers, and a total thickness of all magnetic layers of about 50 to about 100 nanometers. Of course these thicknesses are exemplary only, and various embodiments may have layers of greater or lesser thickness than the illustrative ranges presented herein.

The magnetic layer 806 may include a first magnetic material and nonmagnetic particulates 801 which are different than the magnetic material.

The nonmagnetic particulates 801 of the magnetic layer 806 may be any type of conventional nonmagnetic particulates, e.g., added for the purpose of cleaning the magnetic head. For example, according to one approach, the particulates may include aluminum oxide, chromium oxide, silicon carbide, etc.

The magnetic material in the magnetic layer 806 may include one or more known magnetic materials, including those conventionally used for magnetic tape media. According to one approach, the magnetic material in the magnetic layer 806 may include barium ferrite.

For purposes of an example, the magnetic recording medium 800 is shown to include a defect 802. The defect 802 shown in FIG. 8A is one or more agglomerations of particulates 801, e.g., where the agglomeration is formed during extrusion of the magnetic layer 806. Such agglomeration may be a cluster of nonmagnetic particulates 801, a cluster of magnetic particulates, or a cluster of magnetic and nonmagnetic particulates, any of which may also include binder.

The defect 802 may also and/or alternatively include a dense agglomeration of materials, e.g., an agglomeration of α-hematite, or a foreign particulate in the nonmagnetic underlayer 808. See FIG. 8B, showing a larger defect 802.

In either case, the defect 802 may protrude from the magnetic layer 806, e.g., in the direction D. As noted above, such protruding defect, if not mitigated, could cause smearing of conductive material across a TMR sensor as it passes across a magnetic head.

In one approach, the defect 802 may be described as an "iceberg" profile defect. An iceberg profile defect may extend through one or more other layers of the magnetic recording medium and protrude out of a layer of a magnetic recording medium.

For example, the defect 802 shown on the left hand side of FIG. 8B may be described as having an iceberg profile, because the larger portion of it extends through the magnetic layer 806 and a "tip" protrudes above the magnetic layer 806 in direction D which is perpendicular to the plane of deposition P of the various layers.

The protruding portion of the iceberg profile defect 802 may measure about 5-70 nm, e.g., in direction D, while, the underlying portion, e.g., the non-protruding portion may extend 750-1500 nm into the tape in the thickness direction.

With continued reference to FIG. 8B, in some cases, the magnetic layer 806 and/or protective layer 804 may also protrude in the vicinity of the defect 802, e.g., as shown at the defect 802 on the right hand side of the Figure.

Such defects 802 have been described elsewhere above to be "surface defects", where "surface" may denote that such defects would otherwise be protruding from an uppermost layer in conventional magnetic recording medium, such as a magnetic tape. In sharp contrast however, defects, e.g., defect 802, of the magnetic recording medium 800 and/or one or more other embodiments described herein may be described without the "surface" pre-text, as such defects, e.g., defect 802, preferably do not protrude from the surface of the magnetic recording medium 800 when the magnetic recording medium includes a protective layer 804, as will now be described below.

The magnetic recording medium 800 may include a protective layer 804 above the magnetic layer 806. The protective layer 804 may include a second material. The second material is nonmagnetic in some approaches. In other approaches, the second material is magnetic, and may be the same or different than the first magnetic material of the magnetic layer 806. In some embodiments, the protective layer 804 is non-magnetic or weakly magnetic.

The second magnetic material of the protective layer 804 may include any known magnetic material. According to one approach, the magnetic material in the protective layer 804 may include barium ferrite.

The protective layer 804 may be viscous when formed to promote the protective layer 804 to settle around any defects that may protrude through the protective layer 804, enveloping such defects or at least reducing their effective extent of protrusion.

As shown in FIGS. 8A and 8B, the protective layer 804 may physically envelop the entire protruding portion of some of the defects 802 that protrudes outward from/above the magnetic layer 806.

The protective layer 804 may also and/or alternatively physically envelop a substantial portion, e.g., at least 85% of the protruding surface area, of the defect 802 that protrudes outward/above the magnetic layer 806. Physically enveloping all or a substantial portion of the protruding portion of the defect 802 may prevent the defect 802 from causing a sensor shorting event and/or damaging the thin films of a reader.

To prevent formation of agglomerations in the protective layer 804, the protective layer 804 may be constructed of a material that does not contain nonmagnetic particulates therein when formed. However, other embodiments may include a protective layer 804 with particulates therein.

It should be noted that some of the particulates of the magnetic layer 806 may protrude through the protective layer 804. Any particulates of the magnetic layer 806 that protrude through the protective layer 804 may be considered to be part of the magnetic layer 806 and not a material of the protective layer 804.

A thickness $T_1$ of the protective layer 804 may preferably not be a thickness that would completely cover/physically envelope all of the particulates of the magnetic layer 806 that may protrude through the protective layer 804. Having a thickness $T_1$ of the protective layer 804 that does not completely cover or physically envelope all of the particulates of the magnetic layer 806 may desirably promote cleaning of the head, e.g., see head 126 of FIG. 1A, and/or prevent stiction of the magnetic recording medium to the head. For example, suppose the worst case protrusion would be about 55 nm above the surface of the tape without the protective layer 804. For some heads, this may be enough to cause shorting. In this case, a 15 nm protective layer may be sufficient to effectively reduce the protrusion to 40 nm, which may be sufficient to mitigate shorting. In this case it may be preferable to slightly increase the density or median protrusion of the particulates in the magnetic layer.

The thickness $T_1$ of the protective layer 804 is preferably not so thin as to leave a portion of the defect 802 protruding above the protective layer 804, e.g., in a direction D.

According to one approach, the thickness $T_1$ of the protective layer 804 may be at least 10% of the total thickness $T_2$ of the magnetic recording medium 800 in direction D, which is perpendicular to a plane of deposition P of the protective layer 804.

In a preferred approach, the total thickness $T_3$ of the magnetic and protective layers is a design magnetic thickness of the magnetic recording medium.

The protective layer 804 may be an outermost layer of the magnetic recording medium 800. Accordingly, a lubricant on the outer surface of the medium should not be considered an outer layer in some embodiments.

The protective layer 804 of the magnetic recording medium 800 may however according to some embodiments include a lubricating material. For example, a lubricating material may be embedded in the protective layer 804. In such an approach, any embedded lubricating material that may migrate through the protective layer 804, e.g., in a direction D, to any area above the protective layer 804, again may or may not be considered an outer layer of the protective layer 804 and/or an outermost layer of the magnetic recording medium 800.

Figure 9:
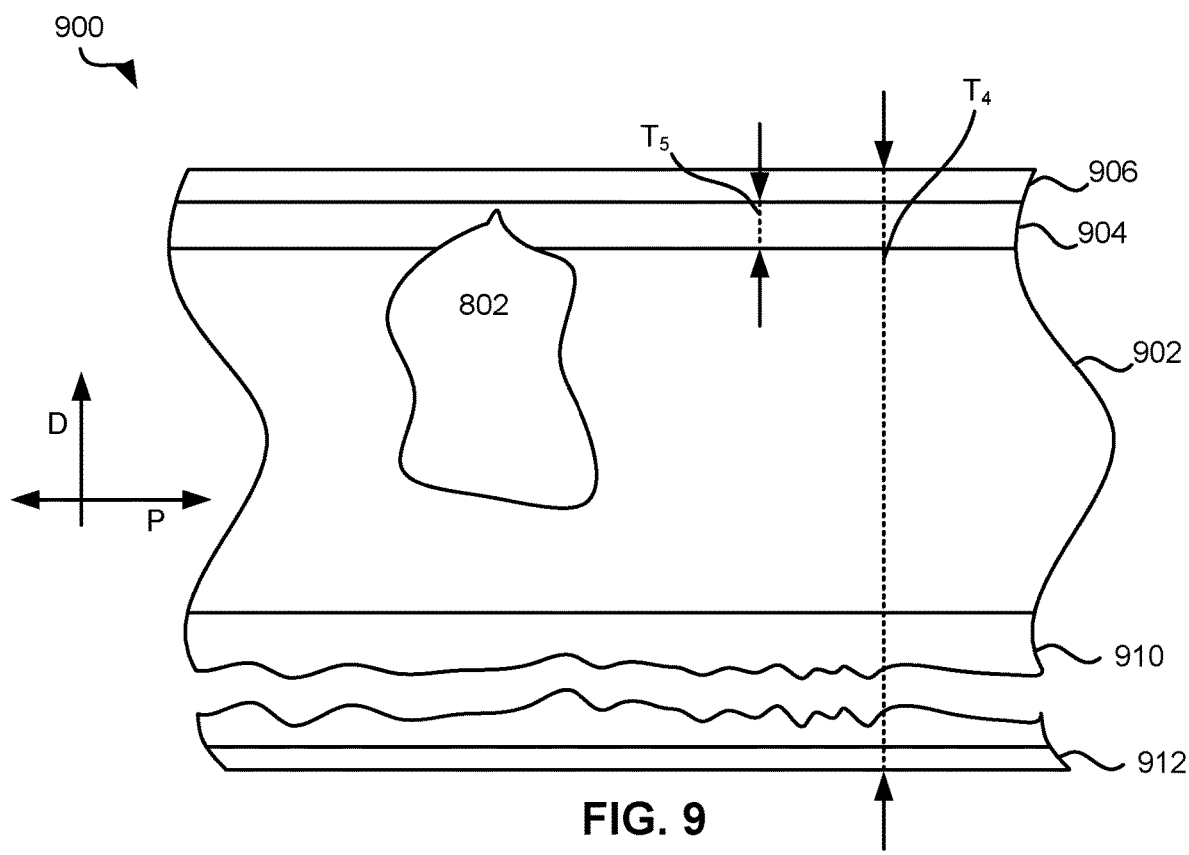
FIG. 9 is a magnetic recording medium with a protective layer, according to one embodiment.

FIG. 9 depicts a magnetic recording medium 900 in accordance with another embodiment. As an option, the present magnetic recording medium 900 may be implemented in conjunction with features from any other embodiment listed herein, such as those described with reference to the other FIGS. Of course, however, such magnetic recording medium 900 and others presented herein may be used in various applications and/or in permutations which may or may not be specifically described in the illustrative embodiments listed herein. Further, the magnetic recording medium 900 presented herein may be used in any desired environment.

Components of the magnetic recording medium 900 may be similar to those of magnetic recording medium 800 of FIG. 8A. For example, the magnetic recording medium 900 may include a conventional base film 910 above a back coat 912.

The magnetic recording medium 900 may include a nonmagnetic underlayer 902 above the base film 910. The nonmagnetic underlayer 902 may have first nonmagnetic particles and, in some embodiments, conventional particulates that are of a different material than the first nonmagnetic particles, and are also preferably weakly magnetic or nonmagnetic.

The first nonmagnetic particles may include any suitable nonmagnetic material. According to one approach, the first nonmagnetic particles may include α-hematite.

The magnetic recording medium 900 may include a second nonmagnetic layer 904 above the underlayer 902. The second nonmagnetic layer 904 may have second nonmagnetic particles which may be the same as or different than the first nonmagnetic particles. Nonmagnetic particulates may or may not be present in the second nonmagnetic layer.

Similar to the first nonmagnetic particles, the second nonmagnetic particles may include any suitable nonmagnetic material. According to one approach, the second nonmagnetic particles may include α-hematite.

It should be noted that the first nonmagnetic particles of the underlayer 902, and the second nonmagnetic particles of the second nonmagnetic layer 904 may include nonmagnetic materials of the same and/or different type, depending on the embodiment.

For purposes of an example, the underlayer 902 is shown to include a defect 802. The defect 802 may include dense agglomerations of material created during formation of the underlayer 902. The defect 802 may be in the form of a particle (solid or agglomeration) that has a dimension, e.g., diameter or length along most distant points thereof, that is at least 50% larger than an average diameter of the particles in the underlayer. In some cases, the defect 802 may have a dimension that is greater than a thickness of the underlayer 902.

The magnetic layer 906 may include a magnetic material, e.g., any known magnetic material, preferably in a binder. According to one approach, the magnetic material in the magnetic layer 906 may include barium ferrite.

Similar to the protective layer 804 of the magnetic recording medium 800, the magnetic layer 906 of the magnetic recording medium 900 may physically envelop a portion of the defect 802 that protrudes outward from/above the underlayer 902, e.g., to prevent the defect 802 from causing a sensor shorting event.

A thickness $T_5$ of the second nonmagnetic layer 904 may preferably be a thickness that would at least partially cover and/or physically envelope such defects 802 of the underlayer 902 that would otherwise protrude into and/or through the magnetic layer 906.

The relative thickness of the magnetic layer 906 compared to a thickness $T_4$ of the magnetic recording medium 900 may vary depending on the forming thicknesses of one or more of the layers of the magnetic recording medium 900.

Figure 10:
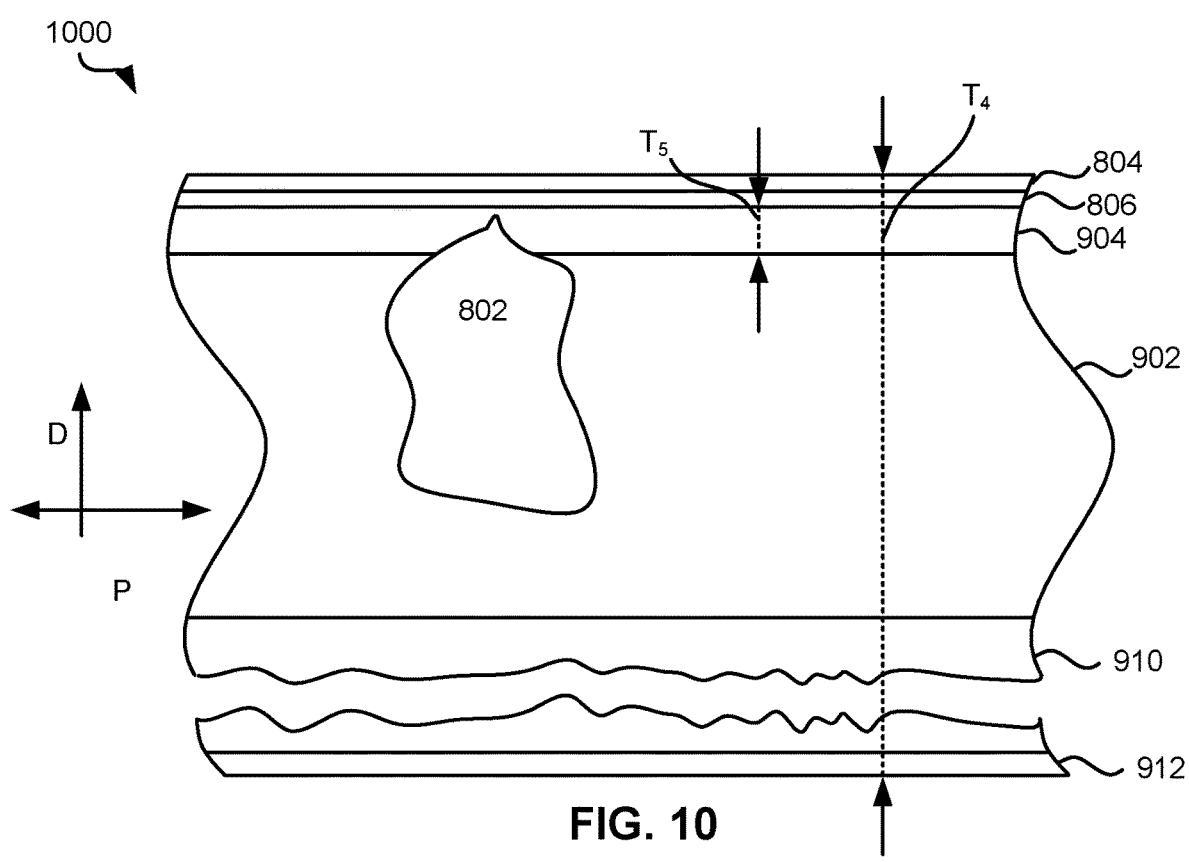
FIG. 10 is a magnetic recording medium with two protective layers, according to one embodiment.

FIG. 10 depicts a magnetic recording medium 1000 in accordance with another embodiment. As an option, the present magnetic recording medium 1000 may be implemented in conjunction with features from any other embodiment listed herein, such as those described with reference to the other FIGS. Of course, however, such magnetic recording medium 1000 and others presented herein may be used in various applications and/or in permutations which may or may not be specifically described in the illustrative embodiments listed herein. Further, the magnetic recording medium 1000 presented herein may be used in any desired environment.

The magnetic recording medium 1000 in the embodiment shown combines features of the mediums 800, 900 of FIGS. 8 and 9. Particularly, the magnetic recording medium 1000 includes the same lower layers as the medium 900 of FIG. 9, but with the first and second magnetic layers 806, 804 as in FIG. 8A replacing the magnetic layer 906 of FIG. 9. The elements of FIG. 10 therefore have common numbering with the associated layers of FIGS. 8 and 9.

One or more layers of the magnetic recording mediums described herein may be formed using a known process. Such known processes may be adapted to create a medium having the desired features described herein.

According to one approach, processes for forming the magnetic recording medium may include depositing materials of the layers using otherwise conventional forming techniques, e.g., lamination, extrusion, co-extrusion, etc.

The forming thicknesses of one or more of the layers of the one or more magnetic recording mediums described herein may vary, e.g., depending on the dimensions of defects expected to be included in the magnetic recording medium, depending on spatial constraints of the media drive in which the magnetic recording medium will be used, depending on the constraints that would be easily identified by one skilled in the art upon reading the present description, etc.

According to the same and/or a different approach, formation of the magnetic recording medium may include forming at least the second nonmagnetic layer above the underlayer using extrusion, e.g. with a blade.

According to one approach, one or more extrusion heads may be used to form one or more of the layers of the magnetic recording media. The layer materials may be formed to the same and/or varying thicknesses.

According to preferred embodiments, various layers of the magnetic recording medium may be extruded sequentially or co-extruded, and thereby cure together.

According to yet other approaches, one or more of the layers may be applied via spraying or the like. This may provide a more conformal coating.

It will be clear that the various features of the foregoing systems and/or methodologies may be combined in any way, creating a plurality of combinations from the descriptions presented above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
   a base film;
   a first nonmagnetic layer above the base film, the first nonmagnetic layer having first nonmagnetic particles of a first nonmagnetic material;
   a second nonmagnetic layer formed above an upper surface of the first nonmagnetic layer, the second nonmagnetic layer having second nonmagnetic particles; and
   a magnetic layer above the second nonmagnetic layer, the magnetic layer including a magnetic material,
   wherein the first nonmagnetic layer includes at least one larger particle of the first nonmagnetic material having a dimension that is at least 50% larger than an average diameter of the first nonmagnetic particles in the first nonmagnetic layer,
   wherein the at least one larger particle protrudes out of the first nonmagnetic layer and into the second nonmagnetic layer.

2. The magnetic recording medium as recited in claim 1, wherein the first nonmagnetic particles include α-hematite.

3. The magnetic recording medium as recited in claim 1, wherein the first nonmagnetic layer further includes particulates.

4. The magnetic recording medium as recited in claim 3, wherein the second nonmagnetic layer does not contain particulates.

5. The magnetic recording medium as recited in claim 1, wherein the second nonmagnetic particles include α-hematite.

6. The magnetic recording medium as recited in claim 1, wherein the second nonmagnetic particles are of a different material than the first nonmagnetic particles.

7. The magnetic recording medium as recited in claim 1, wherein the first nonmagnetic layer includes at least one particle of the first nonmagnetic material having a dimension that is at least twice as great as an average diameter of the first nonmagnetic particles therein.

8. A magnetic recording medium, comprising:
   a base film;
   a first nonmagnetic layer above the base film, the first nonmagnetic layer having first nonmagnetic particles;
   a second nonmagnetic layer above the first nonmagnetic layer, the second nonmagnetic layer having second nonmagnetic particles; and
   a magnetic layer above the second nonmagnetic layer, the magnetic layer including a magnetic material,
   wherein the first nonmagnetic layer includes at least one larger particle having a dimension that is greater than a thickness of the first nonmagnetic layer,
   wherein the at least one larger particle protrudes out of the first nonmagnetic layer and into the second nonmagnetic layer.

9. The magnetic recording medium as recited in claim 1, comprising a protective layer above the magnetic layer, the protective layer including a second material.

10. The magnetic recording medium as recited in claim 9, wherein the second material is magnetic, wherein a composition of the protective layer is different than a composition of the magnetic layer.

11. The magnetic recording medium as recited in claim 10, wherein a total thickness of the magnetic and protective layers is a design magnetic thickness of the magnetic recording medium.

12. The magnetic recording medium as recited in claim 9, wherein the second material is nonmagnetic.

13. The magnetic recording medium as recited in claim 9, wherein the magnetic layer includes a first magnetic material and nonmagnetic particulates.

14. The magnetic recording medium as recited in claim 13, wherein the protective layer is constructed of a material that does not contain the particulates.

15. The magnetic recording medium as recited in claim 13, wherein at least some of the particulates of the magnetic layer protrude through the protective layer.

16. The magnetic recording medium as recited in claim 9, wherein the protective layer is an outermost layer of the magnetic recording medium.

17. The magnetic recording medium as recited in claim 9, wherein the protective layer includes a lubricating material.

18. The magnetic recording medium as recited in claim 9, wherein a thickness of the protective layer is at least 10% of a total thickness of the magnetic recording medium.

* * * * *